United States Patent
Zhang

(10) Patent No.: US 10,457,325 B2
(45) Date of Patent: Oct. 29, 2019

(54) OMNIDIRECTIONAL VEHICLE

(71) Applicant: Dongguan Qiangle Plastic Products Company, Dongguan (CN)

(72) Inventor: Tongqiang Zhang, Dongguan (CN)

(73) Assignee: DONGGUAN QIANGLE PLASTIC PRODUCTS COMPANY, Dongguan (CN)

( * ) Notice: Subject to any disclaimer, the term of this patent is extended or adjusted under 35 U.S.C. 154(b) by 134 days.

(21) Appl. No.: 15/718,785

(22) Filed: Sep. 28, 2017

(65) Prior Publication Data

US 2018/0015950 A1 Jan. 18, 2018

(30) Foreign Application Priority Data

Oct. 28, 2016 (CN) .......................... 2016 1 0969661

(51) Int. Cl.
*B62D 7/15* (2006.01)
*B62D 5/04* (2006.01)
*B60B 19/14* (2006.01)

(52) U.S. Cl.
CPC ............ *B62D 7/1581* (2013.01); *B60B 19/14* (2013.01); *B62D 5/0418* (2013.01); *B62D 7/1509* (2013.01)

(58) Field of Classification Search
CPC ...... B62D 7/1518; B62D 5/0418; B62D 9/00; B62D 7/00; B62D 5/00; D62D 7/1509
See application file for complete search history.

(56) References Cited

U.S. PATENT DOCUMENTS

| | | | | |
|---|---|---|---|---|
| 3,337,231 A | * | 8/1967 | Drake | B62D 7/02 180/253 |
| 5,862,874 A | * | 1/1999 | Brienza | B62D 7/026 180/6.48 |
| 2007/0114074 A1 | * | 5/2007 | Jansson | B60G 3/01 180/6.48 |
| 2015/0113765 A1 | * | 4/2015 | Perry | A61G 5/10 16/28 |

FOREIGN PATENT DOCUMENTS

| | | |
|---|---|---|
| CN | 201914074 U | 8/2011 |
| CN | 203485985 U | 3/2014 |
| EP | 2420431 U | 2/2012 |

* cited by examiner

*Primary Examiner* — Joseph M Rocca
*Assistant Examiner* — Harold Eric Pahlck, III
(74) *Attorney, Agent, or Firm* — Shimokaji IP

(57) ABSTRACT

A omnidirectional vehicle includes a chassis, wheels and wheel steering mechanisms. The wheel steering mechanisms are configured between the chassis and the wheels, and are arranged to drive the wheels to rotate about a steering center shaft of each wheel with 180° or more. The omnidirectional vehicle can achieve longitudinal driving and lateral driving, or other driving manners.

6 Claims, 5 Drawing Sheets

OMNIDIRECTIONAL VEHICLE

CROSS-REFERENCE TO RELATED APPLICATIONS

This application claims the benefit of priority to Chinese Invention Application No. 201610969661.4, filed Oct. 28, 2016, which is hereby incorporated by reference in its entirety.

FIELD OF THE INVENTION

The invention relates to a vehicle, and more particularly to an omnidirectional vehicle.

BACKGROUND OF THE INVENTION

Commonly, two rear wheels of current four wheelers such as cars, electric cars or toy cars cannot turn left or right, while two front wheels can only turn left or right with a small angle. Therefore, such configuration brings a difficult parking, for example, parallel parking is difficult for a fresh hand, and collision accident may easily happen. In addition, the current vehicles lack various driving styles, and the steering operation is complicated, for example, vehicle drift is difficult for common drivers, which results a lower playability.

SUMMARY OF THE INVENTION

One objective of the present invention is to provide an omnidirectional vehicle which can achieve longitudinal driving and lateral driving.

To achieve the above-mentioned objective, the present invention provides an omnidirectional vehicle including a chassis, wheels and wheel steering mechanisms. The wheel steering mechanisms are configured between the chassis and the wheels, and are arranged to drive the wheels to rotate about a steering center shaft of each wheel with 180° or more.

In comparison with the prior art, the wheel steering mechanism is configured on the chassis to drive the wheels to rotate about a steering center shaft of each wheel with 180° or more, thus the wheels can achieve linear moving in forward or backward direction, and lateral moving in left or right direction, thereby achieving omnidirectional driving of the car.

Preferably, each of the wheel steering mechanism comprises a swing arm, one end of the swing arm is pivotally connected to the chassis, and another end of the swing arm is connected to the wheel.

Preferably, the chassis is provided with an arcuate guiding groove, and the swing arm is swingable along the guiding groove.

Preferably, the guiding groove has an arc with a central angle is equal to or larger than 180°.

Preferably, the swing arm is bent with a bending angle is 90°, and the swing arm is provided with a horizontal portion and a vertical portion; the chassis is provided with a pivotal shaft, one end of the horizontal portion is connected to the pivotal shaft of the chassis, and another end of the horizontal portion is connected to the vertical portion; an upper end of the vertical portion is connected to the guiding groove, and a lower end of the vertical portion is connected to the wheel.

Preferably, the omnidirectional vehicle further includes a drive motor which is fixed to the swing arm and has an output end connected to the wheels.

Preferably, each of the wheel steering mechanism further comprises a gear, the gear and the swing arm are coaxially and pivotally connected to the chassis, and the gear is fixed to the swing arm.

Preferably, each of the wheel steering mechanism further comprises a drive rack or a drive gear which is engaged with the gear.

Preferably, the omnidirectional vehicle is a four-wheel car.

Preferably, the wheels are global wheels.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
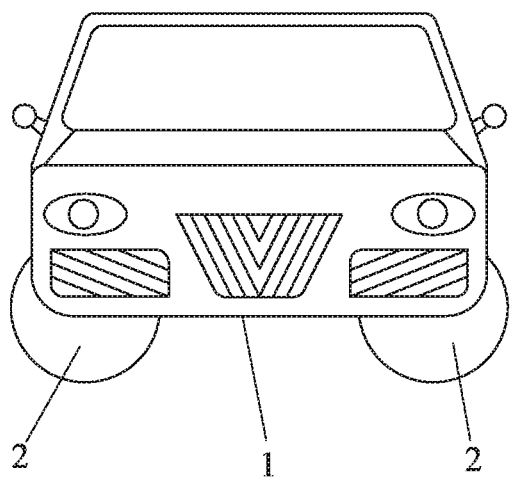
FIG. 1 is a front view of an omnidirectional vehicle according to the present invention.
Figure 2:
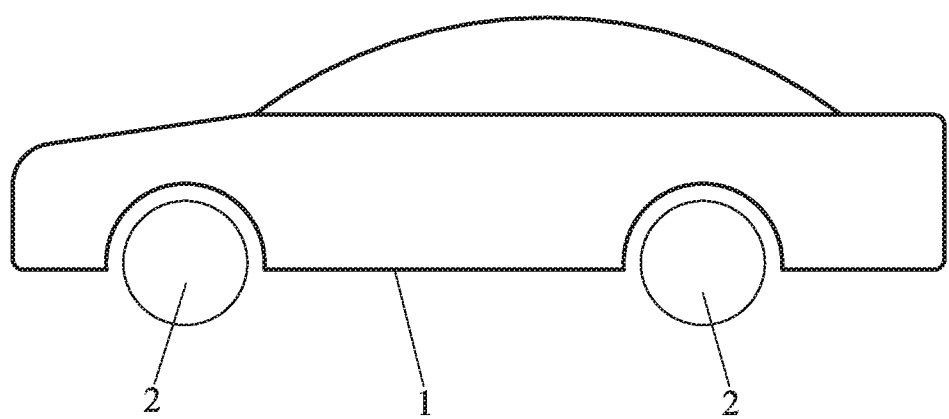
FIG. 2 is a side view of an omnidirectional vehicle according to the present invention.

As shown in FIGS. 1 and 2, an omnidirectional vehicle 100 according to the present invention includes a chassis 1 and four wheels 2, each of which is provided at each side of the front and rear portions of the chassis 1. Specifically, the two wheels 2 at the front portion are located at the same horizontal axis, while the two wheels 2 at the rear portion are located at the same horizontal axis. The wheels 2 may apply the current ordinary wheels, or global wheels, preferably. The global wheels 2 can obtain a more convenient steering, and appearance of the global wheels 2 will not be changed during the steering, thus the omnidirectional vehicle 100 is artistic.

Figure 3:
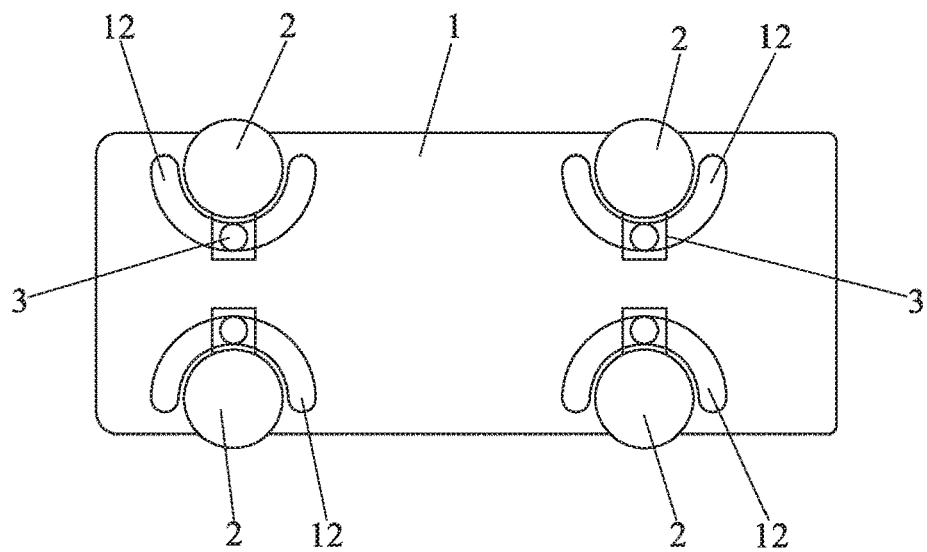
FIG. 3 is a top view of a chassis of the omnidirectional vehicle according to the present invention.
Figure 4:
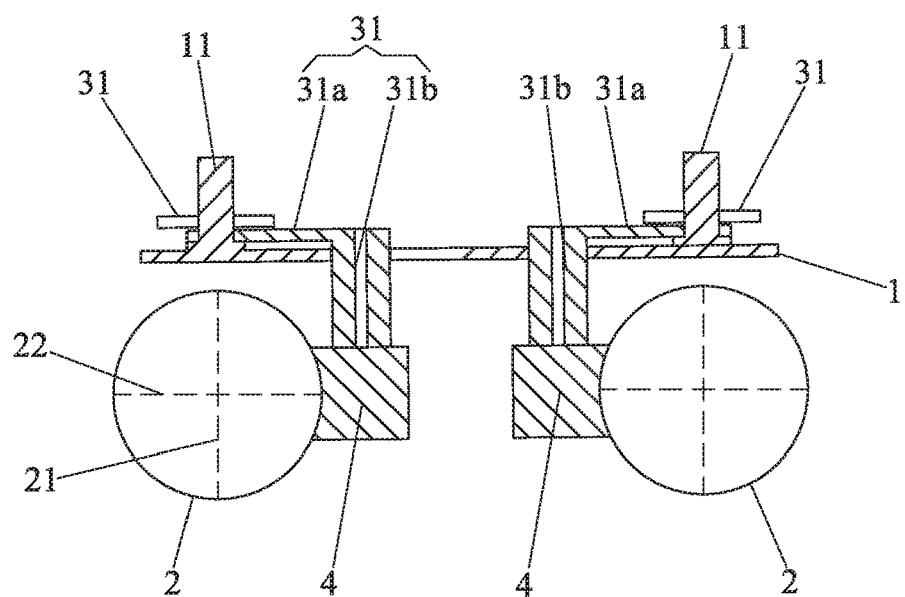
FIG. 4 is a cross section view along A-A line in FIG. 3.

Referring to FIGS. 3 and 4, the omnidirectional vehicle 100 further includes wheel steering mechanisms 3 and drive motors 4. The wheel steering mechanism 2 is configured between the chassis 1 and the wheel 2, to drive the wheel 2 to revolve around its vertical steering center axis 21 with 180° or more. Specifically, the wheel steering mechanisms 3 includes a swing arm 31 which has one end pivotally connected to the chassis 1 and another end connected to the wheel 2. More specifically, the swing arm 31 is a bent structure with a bending angle is 90°, to form a horizontal portion 31a and a vertical portion 31b. A pivotal shaft 11 is provided on the swing arm 31, one end of the horizontal portion 31a is connected to the pivotal shaft 11 of the chassis 1, and the other end of the horizontal portion 31a is fixed on the vertical portion 31b. Further, an arcuate guiding groove 12 is provided on the chassis 1, and is located at the chassis portion 1 that is located above the inner side of the wheel 2.

The guiding groove 12 has an arc with a central angle is equal to or larger than 180°, in this embodiment, the central angle is 180°. The upper end of the vertical portion 31b is inserted in the guiding groove 12 and swingable and movable along the guiding groove 12, and the lower end of the vertical portion 31b is connected to the rotation axis 22 of the wheel 2.

Referring to FIGS. 3 and 4 again, the drive motor 4 is fixed on the lower end of the vertical portion 31b of the swing arm 31, and the output end of the drive motor 4 is connected to the rotation axis 22 of the wheel 2, in such a way, the wheel 2 is driven by the drive motor 4 to revolve around the rotation axis 22, thereby driving the omnidirectional vehicle. By arranging the drive motor on the swing arm 31 to drive the wheels 2, the drive mechanism is simplified. Alternatively, the drive motor 4 also can be configured on the horizontal portion 31a of the swing arm 31 and connected to the wheel 2 by means of a bevel gear.

Referring to FIG. 4, the wheel steering mechanisms 3 further includes a gear 32 and a drive rack (not shown) that are engaged with each other, the gear 32 and the swing arm 31 are coaxial and pivotally connected on the pivotal shaft 11 of the chassis 1, and the gear 32 is fixed to the swing arm 31. In addition, in this embodiment, one gear 32 is driven by one drive rack individually. Of course, two gears 32 located at the same side of the chassis 1 can be driven by the same single drive rack, to achieve the synchronous driving for the two wheels 2 at the same side. Alternatively, a drive gear can be applied to drive the gear 32, and a single drive gear can be configured between the front and the rear gears 32 at the same side to synchronously drive the wheels 2.

Detailed description for the driving principle of the omnidirectional vehicle 100 follows.

Figure 5:
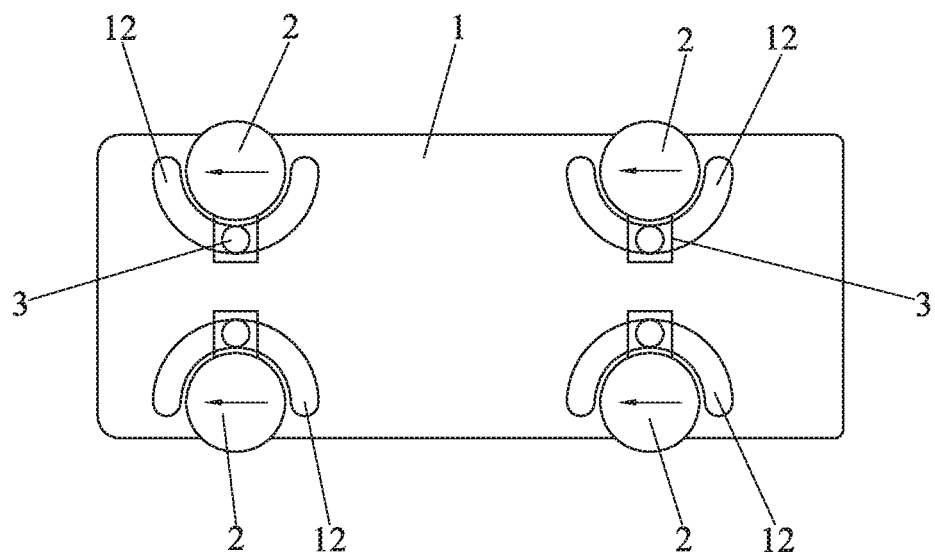
FIG. 5 is a direction diagram of the wheels when the omnidirectional vehicle is driven longitudinally.

As shown in FIG. 5, if the omnidirectional vehicle 100 is needed to drive forward or backward, the swing arms 31 at the front and the rear wheels 2 are located at the middle position of their respective guiding grooves 12, and the rotation axis 22 of the four wheels are perpendicular to the front and rear direction of the chassis 1, as a result, the four wheels 2 can be rolled forward or backward to achieve a longitudinal driving of the car 100.

Figure 6:
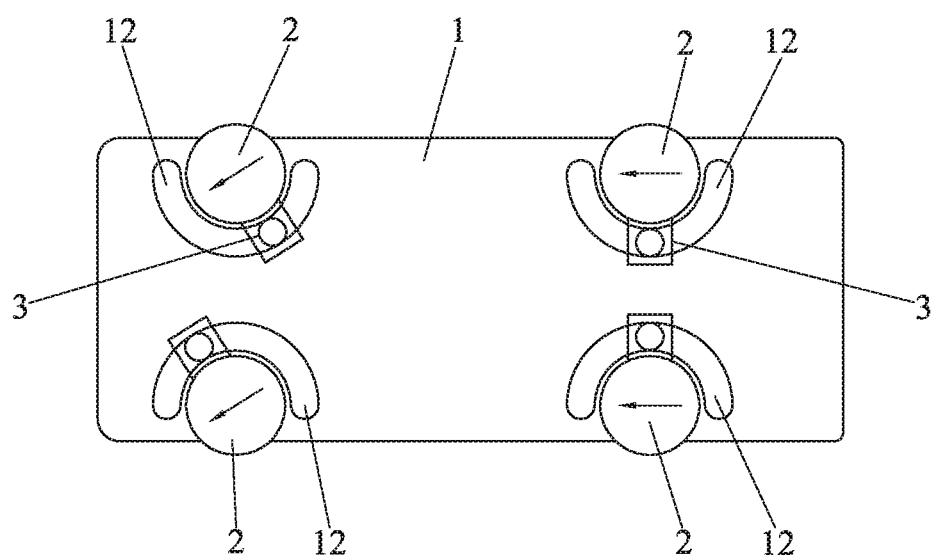
FIG. 6 is a direction diagram of the wheels when the omnidirectional vehicle is veered.

As shown in FIG. 6, if the omnidirectional vehicle 100 is needed to veer, the swing arm 31 at the left front wheel 2 is moved forward along the guiding groove 12 with a certain stroke, meanwhile the swing arm 31 at the right left wheel 2 is moved backward along the guiding groove 12 with the same stroke, in such a way, the two front wheels 2 are turned left with a certain angle, while the two rear wheels 2 are not turned, in this condition, the wheels 2 are driven by the respective drive motors 4 to roll, as a result, the omnidirectional vehicle 100 can be turned left. Similarly, the omnidirectional vehicle 100 can be turned right based on the similar principle.

Figure 7:
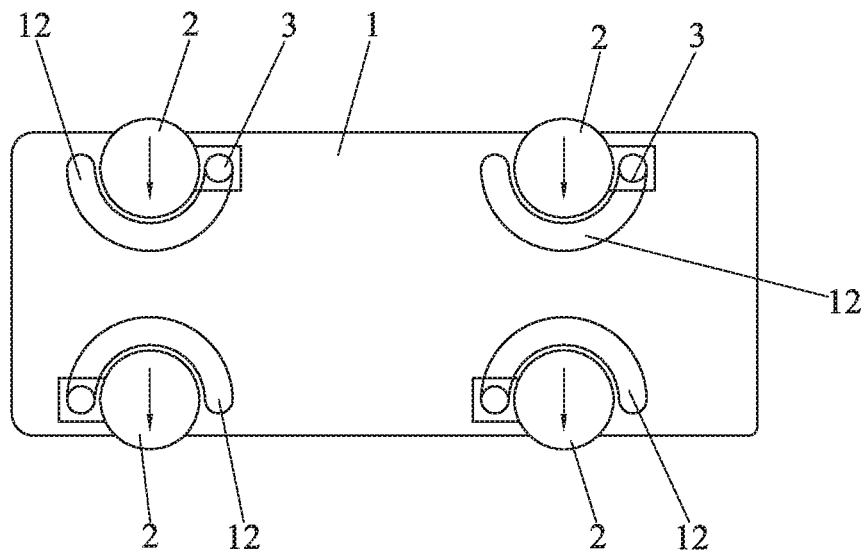
FIG. 7 is a direction diagram of the wheels when the omnidirectional vehicle is driven laterally.

As shown in FIG. 7, if the omnidirectional vehicle 100 is needed to drive laterally, the swing arms 31 at the left front wheel 2 and the left rear wheel 2 are moved forward along the corresponding guiding groove 31 and reaches to the end, meanwhile the swing arms 31 at the right front wheel 2 and the right rear wheel 2 are moved backward along the corresponding guiding groove 31 and reaches to the end, in this condition, the rotation axis 22 of the four wheels 2 are parallel to the front and rear direction of the chassis 1, as a result, the four wheels 2 are driven to roll forward to achieve a left lateral driving of the car 100. Similarly, a right lateral driving of the car 100 also can be achieved.

Figure 8:
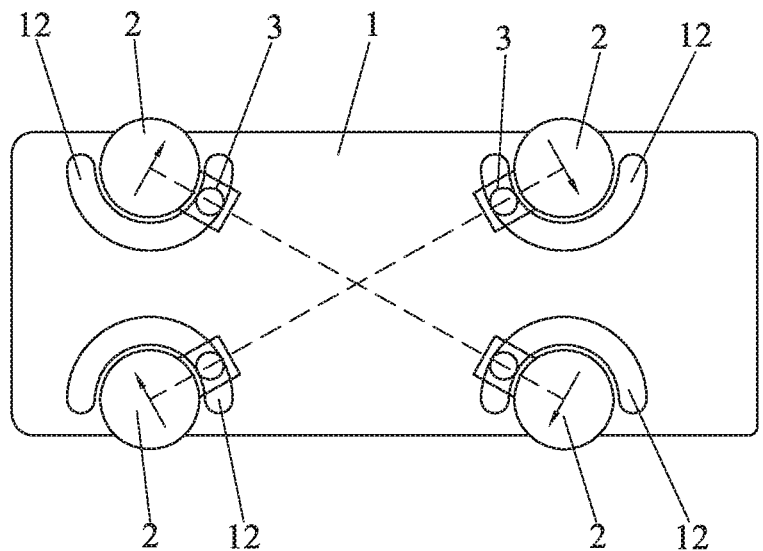
FIG. 8 is a direction diagram of the wheels when the omnidirectional vehicle is revolved clockwise.

As shown in FIG. 8, if the omnidirectional vehicle 100 is needed to revolve clockwise around the center of the chassis 1, the swing arms 31 of the four wheels 2 are moved along the guiding grooves 12, causing the rotation axis 22 at the diagonal wheels 2 to be located at the same straight line; in this condition, the left front wheel and the right rear wheel roll forward, and the right front wheel and the left rear wheel roll backward, thereby achieving the omnidirectional vehicle 100 to revolve clockwise around the center of the chassis 1. Similarly, the omnidirectional vehicle 100 also can revolve counterclockwise around the center of the chassis 2.

Figure 9:
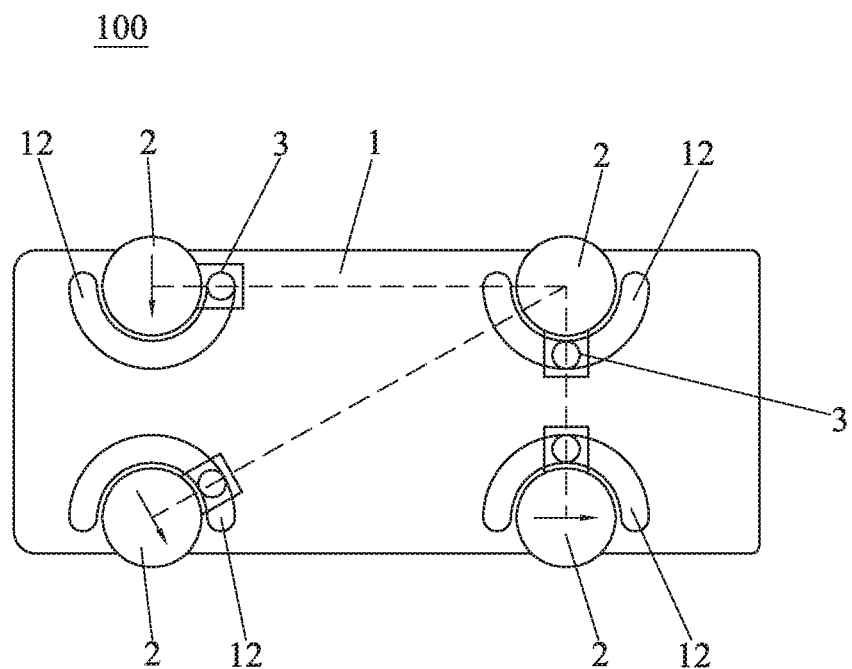
FIG. 9 is a direction diagram of the wheels when the omnidirectional vehicle is revolved around the center axis of the right rear wheel.

As shown in FIG. 9, if the omnidirectional vehicle 100 is needed to revolve counterclockwise around the center axis 21 of the right rear wheel 2, the rotation axis 22 of other wheels 2 are veered along a direction that is vertical to a line between the respective wheel and the right rear wheel, and then the right front wheel rolls forward, the left front wheel rolls backward, the left rear wheel rolls backward, and the right rear wheel doesn't roll, in such a way, the omnidirectional vehicle 100 will revolve anticlockwise around the center axis 21 of the right rear wheel. Similarly, the omnidirectional vehicle 100 also can revolve around other center axis 21 of other wheels 2.

In each driving status of the omnidirectional vehicle 11 mentioned above, the revolving speed, forward rotation and backward rotation of the wheels 2 are controlled by the respective drive motors 4.

Since the chassis 1 of the omnidirectional vehicle 100 is provided with the wheel steering rotation mechanism 3, the swing arm 31 of the wheel steering rotation mechanism 3 can control the wheel 2 to revolve around its center axis 21 thereby achieving wheel swing, further, the chassis 1 is provided with the arcuate guiding groove 12 with central angle of 180°, the guiding groove 12 can not only support the swing arm 31, but also guide the swing arm 31 to swing with 180°, thus, the rotation angle of the wheel 2 can reach to 180°, thereby, the wheel 2 can achieve various moving styles including forward or backward straight line moving, left or right lateral moving, and spot turn. By this token, the car can be driven at any angle or any direction, the structure is simple, and the operation is simple, safe and stable; further, the parallel parking is convenient; additionally, the playability is high for example, car drifting can be obtained if the wheels 2 are veered with a certain angle during the driving.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An omnidirectional vehicle, comprising a chassis, wheels and wheel steering mechanisms, wherein the wheel steering mechanisms are configured between the chassis and the wheels, and are arranged to drive the wheels to rotate about a steering center shaft of each wheel with 180° or more, each of the wheel steering mechanisms comprises a swing arm, one end of the swing arm is pivotally connected to the chassis, and another end of the swing arm is connected to the wheel, the chassis is provided with an arcuate guiding groove, and the swing arm is swingable along the guiding groove, the swing arm is bent with a bending angle of 90°, and the swing arm is provided with a horizontal portion and a vertical portion that are formed in an integration; the chassis is provided with a pivotal shaft, one end of the horizontal portion is directly connected to the pivotal shaft of the chassis, and another end of the horizontal portion is connected to the vertical portion; an upper end of the vertical portion is directly connected to the guiding groove, and a lower end of the vertical portion is connected to the wheel.

2. The omnidirectional vehicle according to claim 1, wherein the guiding groove has an arc with a central angle of equal to or larger than 180°.

3. The omnidirectional vehicle according to claim 1, further comprising a drive motor which is fixed to the swing arm and has an output end connected to the wheels.

4. The omnidirectional vehicle according to claim 1, wherein each of the wheel steering mechanisms further comprises a gear, the gear and the swing arm are coaxially and pivotally connected to the chassis, and the gear is fixed to the swing arm.

5. The omnidirectional vehicle according to claim 1, wherein the omnidirectional vehicle is a four-wheel car.

6. The omnidirectional vehicle according to claim 1, wherein the wheels are global wheels.

\* \* \* \* \*